(No Model.)
H. A. WHEELER.
FILTER.
No. 550,034. Patented Nov. 19, 1895.
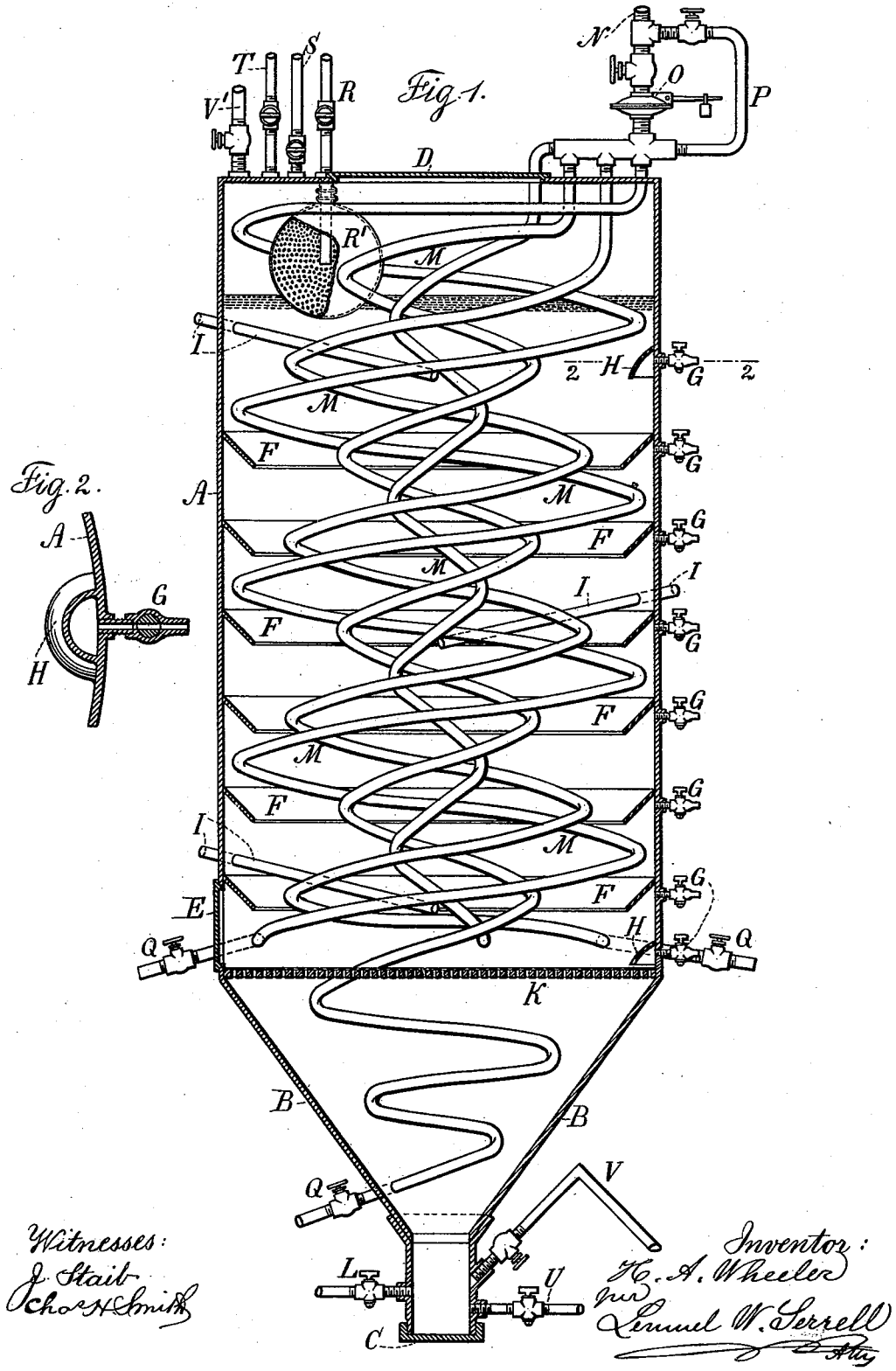

UNITED STATES PATENT OFFICE.

HERBERT A. WHEELER, OF ST. LOUIS, MISSOURI.

FILTER.

SPECIFICATION forming part of Letters Patent No. 550,034, dated November 19, 1895.

Application filed March 14, 1895. Serial No. 541,649. (No model.)

*To all whom it may concern:*

Be it known that I, HERBERT A. WHEELER, a citizen of the United States, residing at St. Louis, in the State of Missouri, have invented an Improvement in Filters, of which the following is a specification.

This present improvement is especially adapted to filters in which bone-black is made use of in the filtering of oils or sirups. I make use of a vessel for holding such bone-black and apply around the interior surface at intervals inclined flanges projecting inwardly for preventing the liquid that is being filtered flowing down between the bone-black and the vessel instead of passing through such bone-black. I also make use of try-cocks that are straight and open through the filtering-vessel into a space between a deflector and such filtering-vessel, so that the bone-black is kept away from the try-cock, and, being straight, a wire or similar article can be thrust through the try-cock to remove any foreign substance that may obstruct the same. I also make use of coils of pipes within the filtering-vessel for regulating the temperature at which the filtration is effected, and thermometer-wells are provided for the reception of thermometers to test the temperature, and provision is made for supplying water, naphtha, or other solvent for washing out from the bone-black such materials as may be soluble previous to the removal of the bone-black for calcination, and by heating up the bone-black by the steam-coils after the water, naphtha, or other material has been run through the filter for removing solvent substances I am enabled to dry the bone-black, so that it can be removed with great facility from the filter instead of remaining in an adhesive mass that is difficult of removal, as has heretofore been the case.

In the drawings, Figure 1 is a vertical section of the filtering apparatus, and Fig. 2 is a partial sectional plan at the line 2.

The vessel A is preferably cylindrical, with a conical bottom B, with a screw-cap C, that can be removed for withdrawing sediment or other foreign substances, and at the top of the vessel A is a charging-door D, that can be removed when necessary and fits tightly when replaced, and at E is a discharge-door that can be opened for the removal of the bone-black or other materials, and which discharge-door can also be tightly closed.

Within the vessel A there are inclined flanges F, projecting inwardly and placed at suitable intervals in the height of the vessel, which flanges F, being made integral with the vessel A or tightly attached at their upper edges, serve to deflect the liquid that is being filtered toward the middle of the filter and into the bone-black, so as to prevent the liquid following the interior surface of the vessel A and not being fully filtered.

The try-cocks G are placed at suitable distances apart, and they are made straight, so that they can be cleaned with facility, if obstructed, by the insertion of a wire or other device, and the deflectors H are applied within the vessel A and behind the inner ends of the try-cocks and placed at an inclination, so as to lessen the risk of bone-black or similar material passing into the try-cocks, and where it is more convenient to employ either of the inclined flanges as deflectors in place of using separate deflectors the try-cocks are placed adjacent to the inclined flanges F, so that such inclined flanges lessen the risk of bone-black passing into the try-cocks.

It is desirable to introduce thermometer-wells I through the vessel A and at suitable places, so as to ascertain the temperature of the filter. I have shown three of such thermometer-wells, and at the lower part of the vessel A a perforated bottom or grating K is represented, which is advantageously covered by filter-cloth, so that the bone-black is suitably supported; but the liquid that has been filtered passes freely through such filter-cloth into the conical bottom of the vessel A and can be withdrawn by the pipe and cock L.

In order to obtain the desired temperature in the filtering material, I employ steam-coils M. I have shown four of these connected to the steam-supply pipe N, and it is advantageous to make use of a pressure-regulator at O, so as to maintain the proper pressure of steam within the coils, and by providing a by-pass P with a valve the steam can be allowed to pass direct into the coils when greater pressure or temperature is desired. The water of condensation or steam discharge is to be passed away in any suitable manner. I have represented such discharge as being regulated by the cocks Q, and have also shown one coil of the steam-pipe as extended down into the conical bottom B of the vessel A, so as to maintain the desired temperature in the filtered liquid which may remain in such conical bottom.

A relief-pipe S may be provided and fitted with a safety-valve, if desired, to prevent the accumulation of undue pressure in the filter, and the oil or other material to be filtered is supplied by the feed-pipe R and passes down through the filtering material, and the impurities are retained thereby, and such oil or other filtered material is drawn away by the pipe L. By this apparatus the operation of the filter is rendered uniform and reliable, because the proper temperature can be maintained to render the oil or other liquid sufficiently limpid to flow freely and cause the impurities to be retained by the bone-black.

A pipe T is provided through which water, naphtha, or other material may be run into the filter after the supply of oil or other material is cut off, so as to wash the bone-black and remove from the same the soluble materials, and the water, naphtha, or other liquid is drawn off by the pipe U, to be treated in any desired manner, and after the soluble impurities have been washed out from the bone-black, either in the presence of heat or not, as may be desired, the steam heat is applied to dry the bone-black, and the vapor generated can be passed away by a pipe V to a condenser for saving the naphtha or other solvent, and when the bone-black is sufficiently dry the discharge-door E is opened and such material removed for treatment, as usual, and fresh bone-black or other filtering material is introduced through the door D.

There may be a pipe V' at the top of the filter for the lighter naphtha or similar vapors to pass away, in addition to the lower pipe V for heavier vapors.

When desired, the bag R' may be fastened around the collars at the end of the pipe R within the filter, and such bag contains bone-black, charcoal, or similar material to detain any solid foreign substances that may run in with the oil or other material to be filtered, and this prevents the surface of the bone-black becoming coated with such solid foreign substances, and the bag can be easily changed when the cover D is removed.

I claim as my invention—

The combination in a filtering apparatus, of a vessel for holding bone black or similar material having a conical lower end, a perforated bottom and filtering cloth for supporting the filtering material, inwardly projecting inclined flanges, steam coils for heating the filtering material, and a pressure regulator for maintaining the proper pressure and temperature of the steam coils, a feed pipe for the material to be filtered, and a discharge pipe for such material, a pipe for supplying naphtha, water, or other material for washing the bone black, and a discharge pipe for such material and a pipe for conveying away the vapors from the apparatus, substantially as set forth.

Signed by me this 5th day of March, 1895.

HERBERT A. WHEELER.

Witnesses:
F. HENDERSON,
F. CLARK.